United States Patent
Li

(10) Patent No.: US 8,763,963 B1
(45) Date of Patent: Jul. 1, 2014

(54) PANEL SUPPORTING DEVICE WITH ELEVATING FUNCTION

(71) Applicant: Chin-Chu Li, Taichung (TW)

(72) Inventor: Chin-Chu Li, Taichung (TW)

( * ) Notice: Subject to any disclaimer, the term of this patent is extended or adjusted under 35 U.S.C. 154(b) by 2 days.

(21) Appl. No.: 13/726,227

(22) Filed: Dec. 24, 2012

(51) Int. Cl.
*F16M 11/00* (2006.01)
*F16M 11/24* (2006.01)

(52) U.S. Cl.
USPC ............... 248/125.9; 248/161; 248/188.2

(58) Field of Classification Search
USPC .......... 248/157, 161, 422, 188.2, 188.5, 158, 248/188.4, 188.8, 125.7–125.9, 292.12, 248/650, 676–678, 919
See application file for complete search history.

(56) References Cited

U.S. PATENT DOCUMENTS

| 1,748,948 | A | * | 3/1930 | Gassen | 414/198 |
| 3,215,402 | A | * | 11/1965 | Hott et al. | 254/7 B |
| 3,495,806 | A | * | 2/1970 | Sutton | 254/107 |
| 6,073,903 | A | * | 6/2000 | Lindsay | 248/404 |
| 7,658,359 | B2 | * | 2/2010 | Jones et al. | 248/406.1 |
| 7,854,417 | B2 | * | 12/2010 | Gan et al. | 248/161 |
| 2007/0240347 | A1 | * | 10/2007 | Chang | 248/329 |

FOREIGN PATENT DOCUMENTS

TW M396055 1/2011

* cited by examiner

*Primary Examiner* — Tan Le
(74) *Attorney, Agent, or Firm* — Chun-Ming Shih; HDLS IPR Services

(57) ABSTRACT

A panel supporting device with elevating function includes a supporting frame, a supporting sleeve, a guiding cover member, a driving block, a lead screw and a positioning liner. The supporting frame includes a plurality of guiding posts. The supporting sleeve is disposed between the guiding posts and connected to the panel. The guiding cover member fixedly covers an outside of the supporting sleeve and has a plurality of guiding holes in which the guiding posts penetrate. The driving block is fixed inside the supporting sleeve and has a screw hole and an inserting slot. The lead screw is accommodated inside the supporting sleeve and screwed in the screw hole. The positioning liner is accommodated inside the supporting sleeve and penetrates the inserting slot, thereby preventing the supporting sleeve from tilting or vibrating during up and down movement.

11 Claims, 9 Drawing Sheets

PANEL SUPPORTING DEVICE WITH ELEVATING FUNCTION

BACKGROUND OF THE INVENTION

1. Field of the Invention

The present invention relates to a supporting device, in particular, to a panel supporting device with elevating function.

2. Description of Related Art

Usually, a large-scale touch panel used in guidance or meeting information playback is fixed-type, and the height thereof cannot be adjusted by users. Hence, it develops a panel supporting device with elevating function to render users with the option of elevating the height of the panel such that users would feel much more convenient and comfortable when using the panel.

A prior panel supporting device primarily comprises a screw, a connecting block, a supporting inner sleeve, a supporting outer sleeve and a motor. The connecting block has a screw hole in which the screw is screwed. The screw, the connecting block and the motor are disposed in the supporting inner sleeve. An upper surface of the supporting inner sleeve is connected to the panel. The screw has an end connected to the motor. An outside face of the connecting block is connected to an inside face of the supporting sleeve. The supporting outer sleeve covers and slides outside the supporting inner sleeve so as to drive the motor to rotate the screw. The screw drives the connecting block to move up and down. The connecting block drives the supporting inner sleeve to extend or retract with respect to the supporting outer sleeve so as to elevate the panel.

The prior panel supporting device still has the following disadvantages that the screw is the mere support such that the screw easily tilts due to the over weight of the panel during elevation of the panel, and thus the panel tilts or vibrates when moving up or down. In addition, positioning of height of elevation will be imprecise due to the tilted screw or heavier panel cannot be supported.

SUMMARY OF THE INVENTION

An objective of the present invention is to provide a panel supporting device with elevating function, which use a positioning liner penetrating and sliding in an inserting slot of a driving block so as to supporting acting force of a panel applied on a lead screw so as to prevent a supporting sleeve from tilting or vibrating when moving up and down.

In order to achieve the above-mentioned objective, the present invention provides a panel supporting device with elevating function comprising a supporting frame, a supporting sleeve, a guiding cover member, a driving block, a lead screw and a positioning liner. The supporting frame includes a plurality of guiding posts separated with each other. A separating space is formed between adjacent guiding posts. The supporting sleeve is disposed inside the separating space and has a side located away from the supporting frame and connected to the panel. The guiding cover member fixedly covers an outside of the supporting sleeve and has a plurality of guiding holes in which the guiding posts penetrate and slide. The driving block is fixed inside the supporting sleeve and has a screw hole and an inserting slot. The lead screw is accommodated inside the supporting sleeve and screwed in the screw hole. The positioning liner is accommodated inside the supporting sleeve and penetrates and slides in the inserting slot. The lead screw is driven to rotate so as to render linear reciprocating movement of the driving block such that the driving block drives the supporting sleeve to move up and down, and that the supporting sleeve drives said panel to elevate.

The present invention further has the following effects: 1) the positioning liner and each of the guiding posts share acting force of the panel applying on the lead screw so as to carry heavier panel and improve positioning precise of elevation of the panel; 2) disposing the panel rotating mechanism between the panel and the supporting sleeve can rotatedly adjust angle of the panel; 3) since the worm gear is vertical to horizontal line, a gap between the worm gear and the first gear during the worm gear driving the first gear can be avoided such that the panel is prevented from vibrating while rotating; 4) since the second gear and the pinion gear both are helical gears, it can prevent the first gear from driving the worm gear to reversely rotate; 5) covering the gear box outside the gear assembly so as to prevent from dust or external articles from entering the gap of the gear assembly.

DETAILED DESCRIPTION OF THE INVENTION

The detailed description and the technical contents of the present invention are illustrated with the accompanied drawings as follows. The accompanied drawings merely provide reference and description instead of a limit to the present invention.

Figure 1:
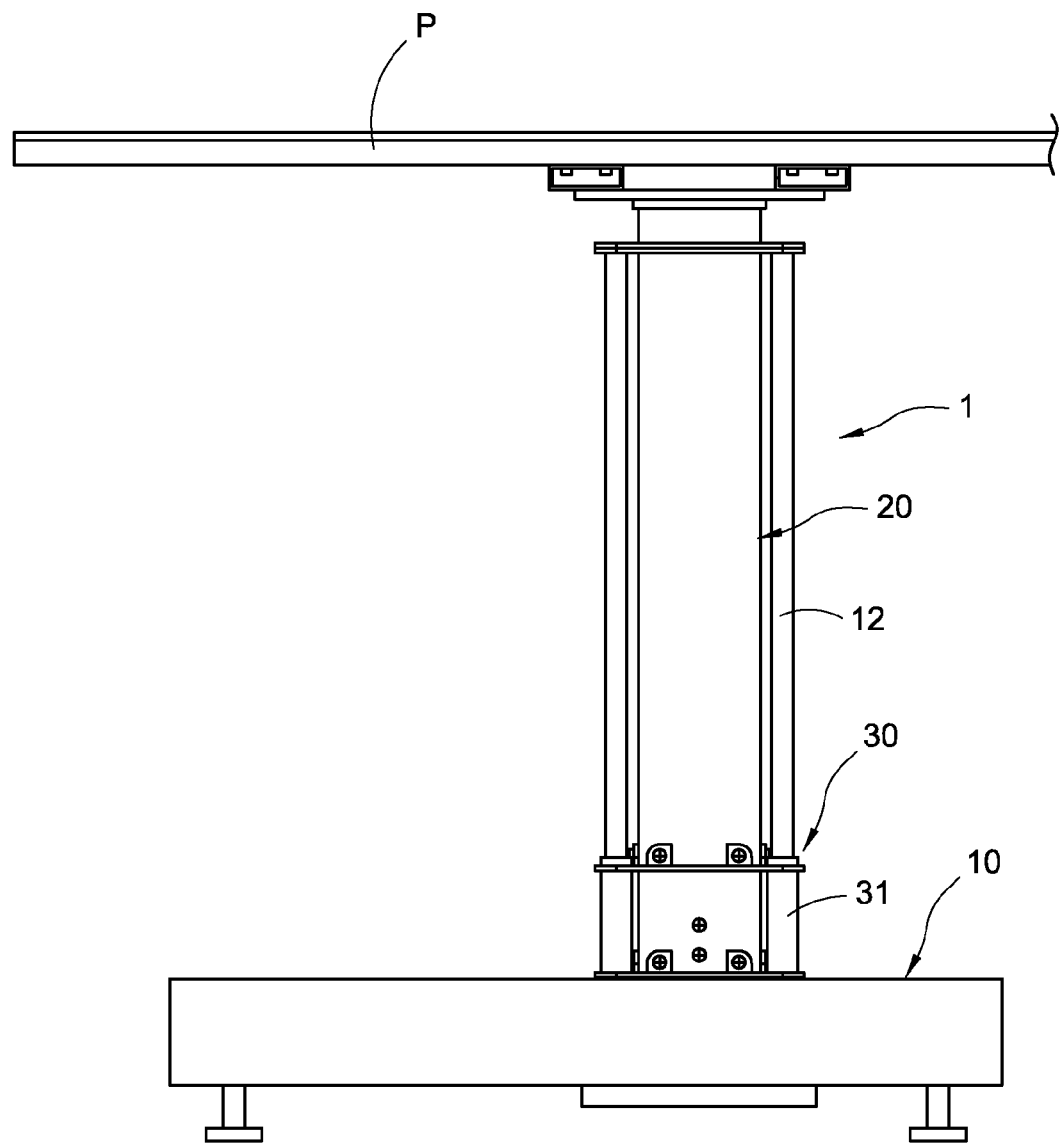
FIG. 1 is a schematic diagram according to a first embodiment of the present invention.
Figure 2:
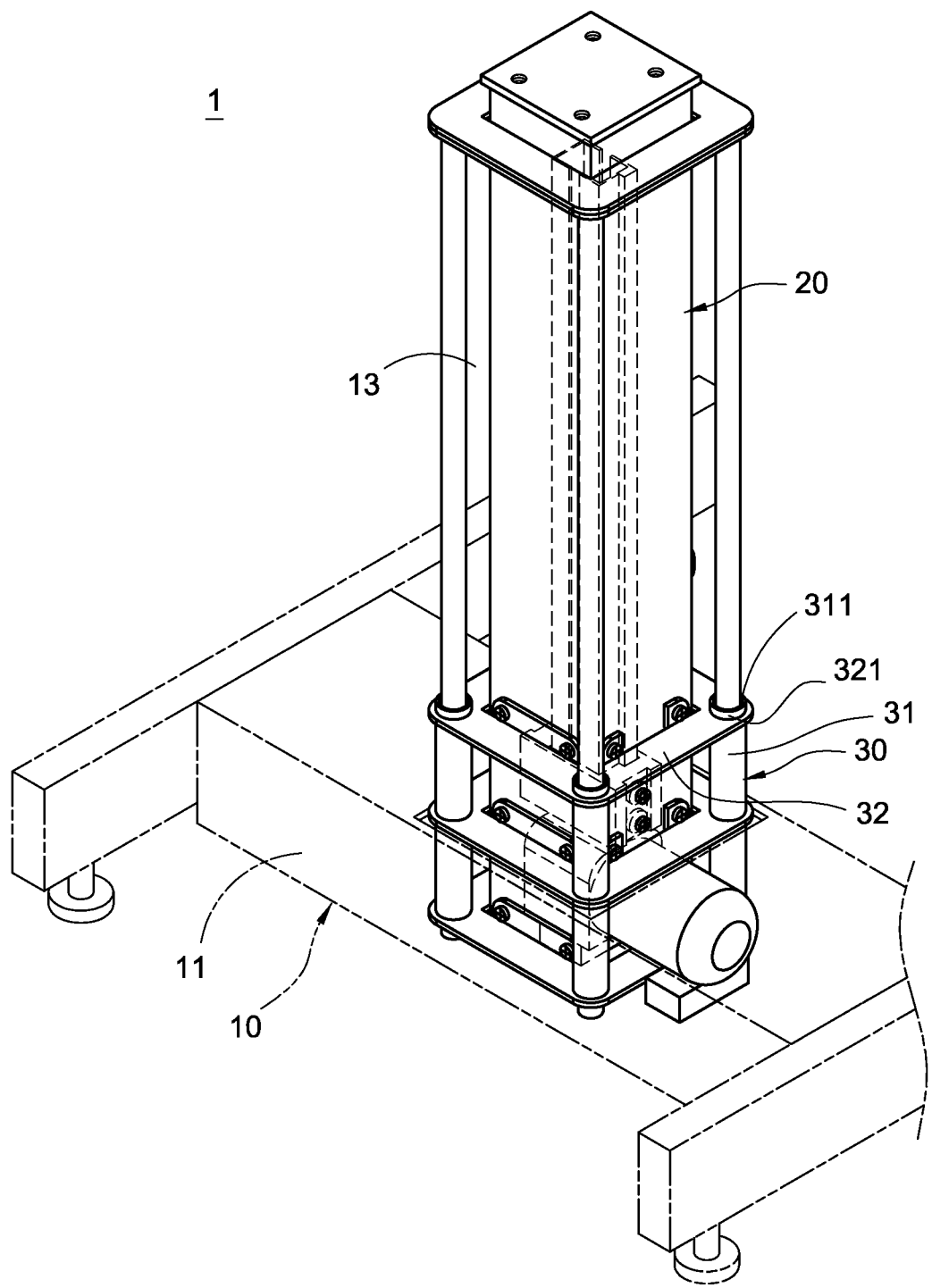
FIG. 2 is a perspective assembly diagram according to the first embodiment of the present invention.
Figure 3:
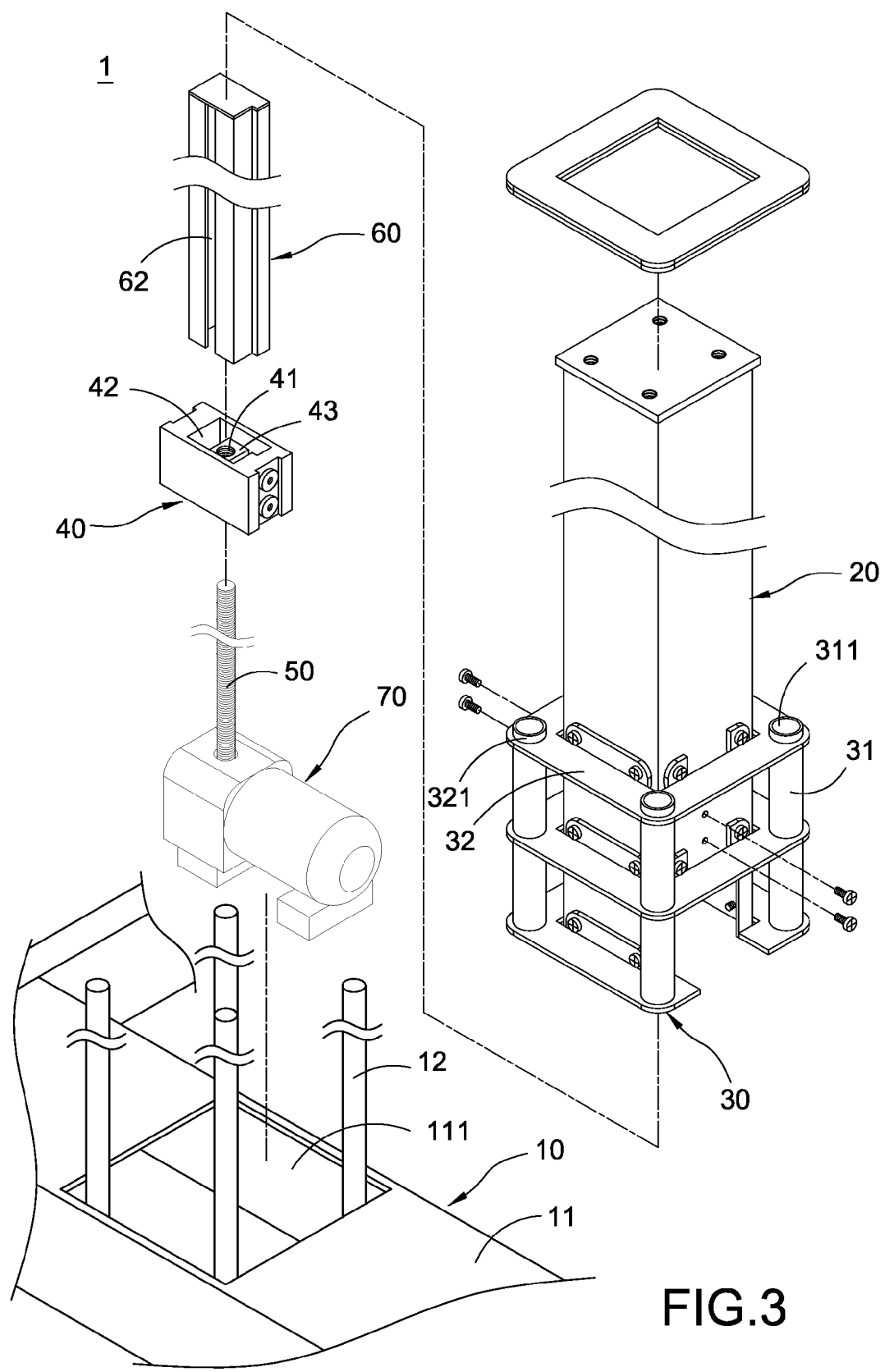
FIG. 3 is a perspective explosion diagram according to the first embodiment of the present invention.

Please refer to FIGS. 1-3, which are schematic diagram, perspective assembly diagram and perspective explosion diagram according to a first embodiment of the present invention, the present invention provides a panel supporting device 1 with elevating function, primarily comprising a supporting frame 10, a supporting sleeve 20, a guiding cover member 30, a driving block 40, a lead screw 50 and a positioning liner 60.

The supporting frame 10 includes a base 11 and a plurality of guiding posts 12 each of which has an end connected to the base 11. The base 11 has a containing slot 111. The guiding posts 12 are separated with each other. A separating space 13 is formed between adjacent guiding posts 12.

The supporting sleeve 20 is disposed inside the separating space 13 of the supporting frame 10 and has a side away from the supporting frame 10 connected to a panel P. The supporting sleeve 20 has a containing space 21.

The guiding cover member 30 fixedly covers an outside of the supporting sleeve 20 and is disposed between the supporting sleeve 20 and the supporting frame 10. The guiding cover member 30 includes a plurality of guiding sleeves 31 and an annular plate 32. The guiding sleeves 31 are separated with other and fixedly surround an outside of the supporting sleeve 20. Each of the guiding sleeves 31 has a guiding hole 311. Each of the guiding posts 12 penetrates and slides in each of the guiding holes 311. The annular plate 32 has a plurality of fixing holes 321 and fixedly covers an outside of the supporting sleeve 30. Each of the fixing holes 321 fixedly covers an outside of each of the guiding sleeves 31.

The driving block 40 is disposed inside the containing space 21 of the supporting sleeve 20 and has two sides fixedly connected to an internal wall of the supporting sleeve 20, respectively. The driving block 40 has a screw hole 41 and an inserting slot 42. The inserting slot 42 is located at a side of the screw hole 41. A bump 43 is formed between the inserting slot 42 and the driving block 40. The screw hole 41 is formed on the bump 43.

The lead screw 50 is disposed inside the containing space 21 of the supporting sleeve 20 and screwed to the screw hole 41 of the driving block 40.

The positioning liner 60 is disposed inside the containing space 21 of the supporting sleeve 20 and penetrates and slides in the inserting slot 42 of the driving block 40. The positioning liner 60 has a hollow sliding way 61 and an opening slot 62 formed on a side of the positioning liner 60 and communicated with the hollow sliding way 61. The bump 43 and the positioning liner 60 slide into the hollow sliding way 61 from the opening slot 62.

The supporting device 1 further comprises a motor 70 accommodated in the containing slot 111 of the base 11 and connected to an end of the lead screw 50 away from the supporting sleeve 20.

Figure 4:
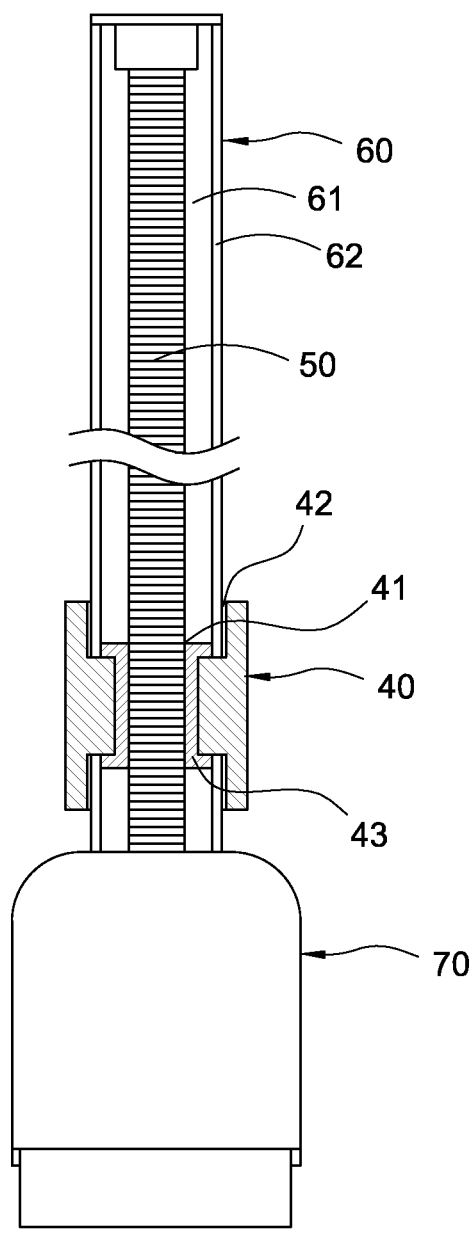
FIG. 4 is a sectional schematic diagram according to the first embodiment of the present invention.
Figure 5:
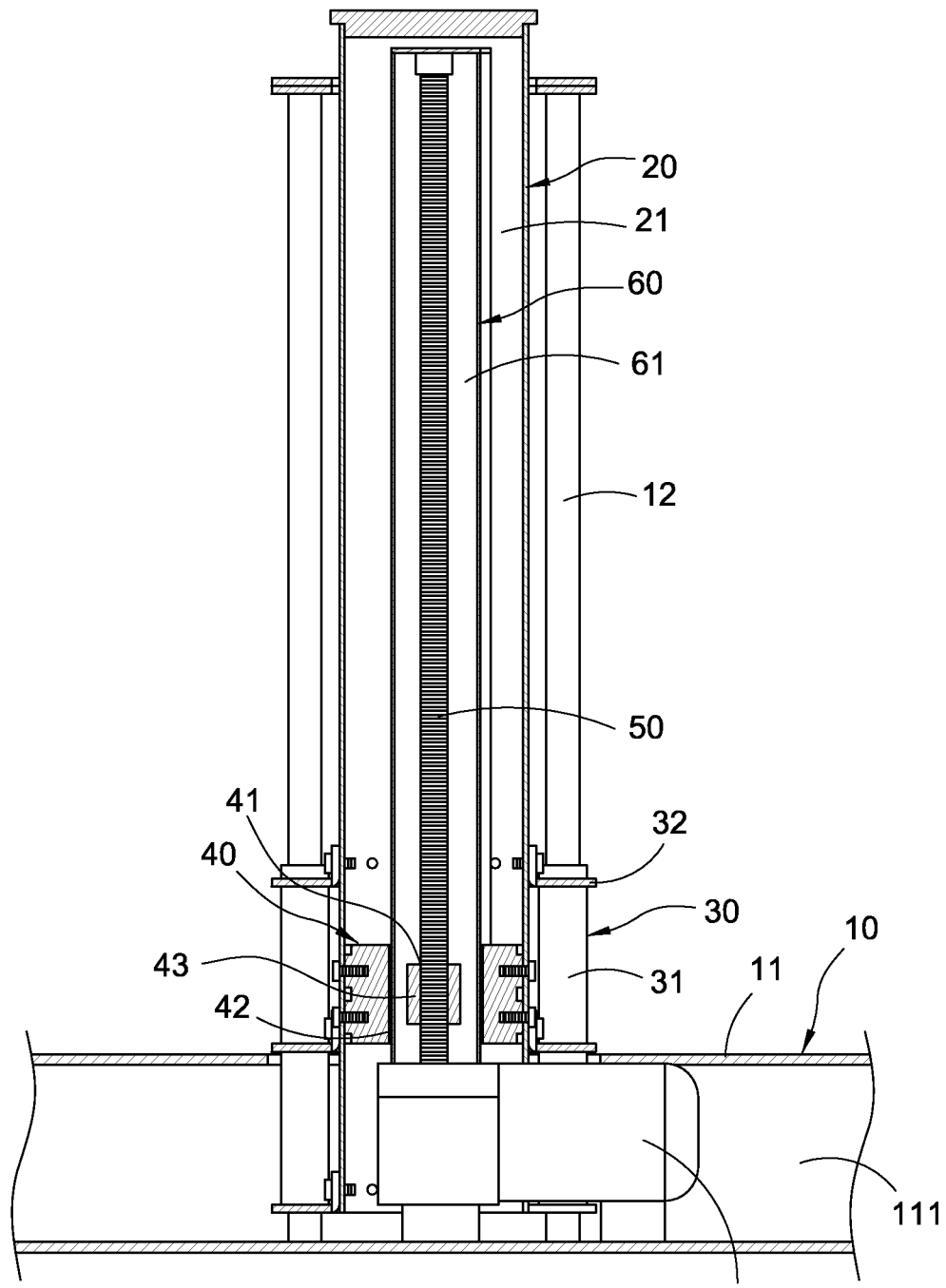
FIG. 5 is a sectional assembly diagram according to the first embodiment of the present invention.
Figure 6:
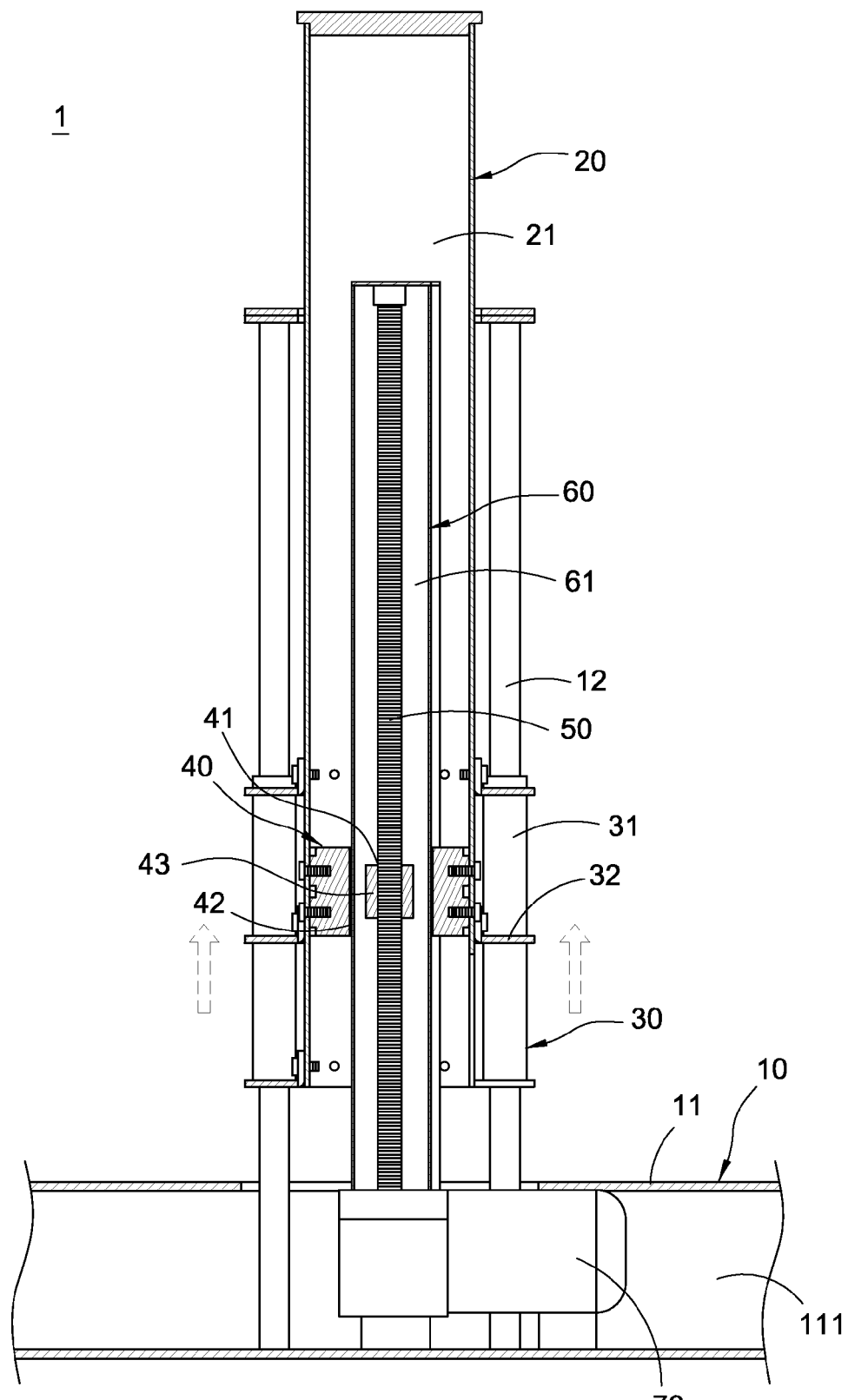
FIG. 6 is a sectional view showing the application of the first embodiment of the present invention.

Please refer to FIGS. 4-6, which are sectional schematic diagram, sectional assembly diagram and sectional view showing the application according to the first embodiment of the present invention, when in usage, the motor 70 is activated to drive the lead screw 50 to rotate so as to render linearly reciprocating up or down movement of the driving block 40, thereby elevating the panel P.

The lead screw 50 is driven to rotate by activating the motor 70 so as to drive the driving block 40 to move up or down. It can precisely control the height of the elevation of the supporting sleeve 20 better, thereby achieving much more precise positioning of the elevation height of the panel P.

In addition, the driving block 40 can elevates along the positioning liner 60 by the positioning liner 60 penetrating and sliding in the inserting slot 42 of the driving block 40 so as to enforce the structural strength between the lead screw 50 and the driving block 40 and to decrease twisting force generated through the driving block 40 elevating on the lead screw 60 during rotation of the lead screw 50 such that tilt or vibration condition generated during elevation of the supporting sleeve 20 is avoided. The positioning liner 60 can further support acting force through weight of the panel P applied on the lead screw 50, such that the supporting device 1 can carry heavier panel P. Additionally, it also can precisely control the height of the elevation of the supporting sleeve 20 better, thereby achieving much more precise positioning of the elevation height of the panel P.

In addition, each of the guiding sleeves 31 slides on each of the guiding posts 12 such that the acting force generated through the weight of the panel P can be distributed to each of the guiding posts 12 so as to enhance the structural strength of the supporting device 1 and to increase weight capacity of the panel P of the supporting device 1.

Figure 7:
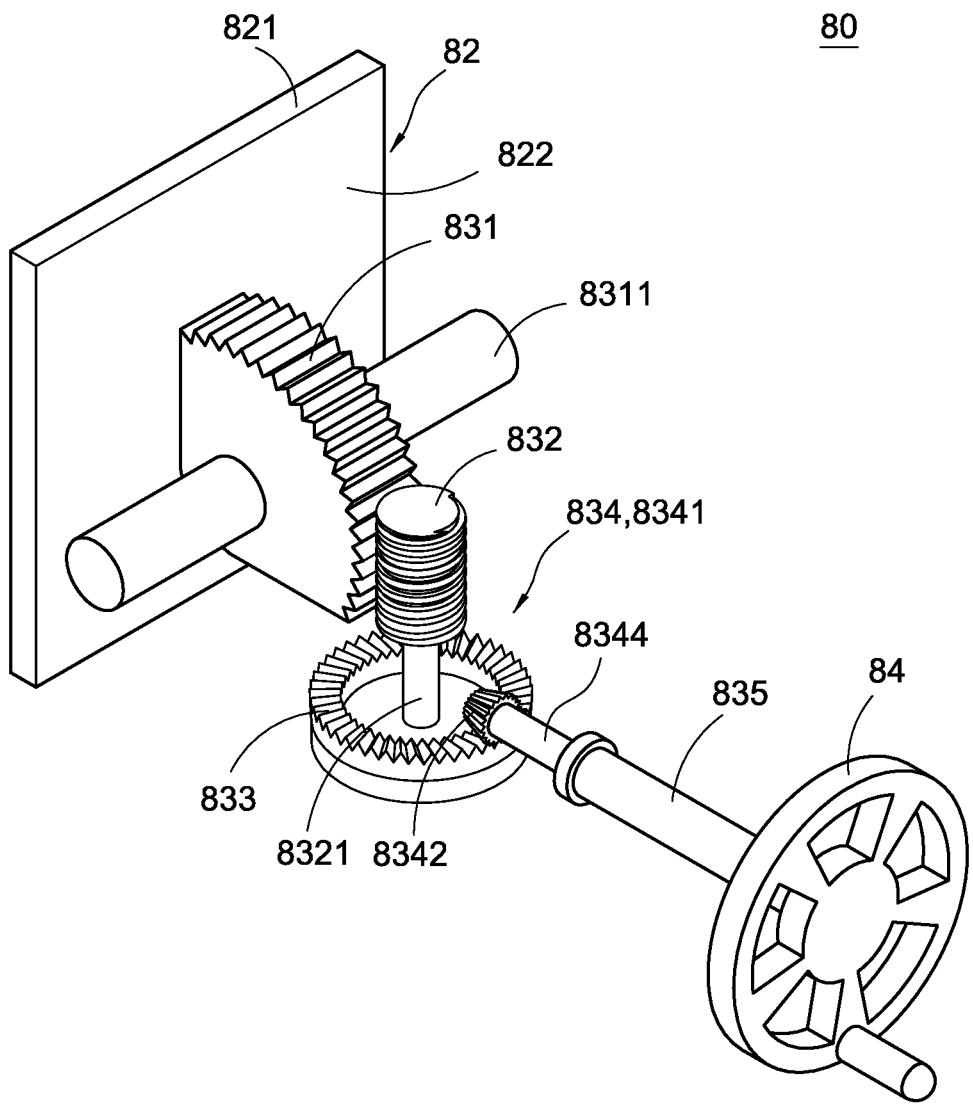
FIG. 7 is a perspective view of a panel rotating mechanism according to a second embodiment of the present invention.
Figure 8:
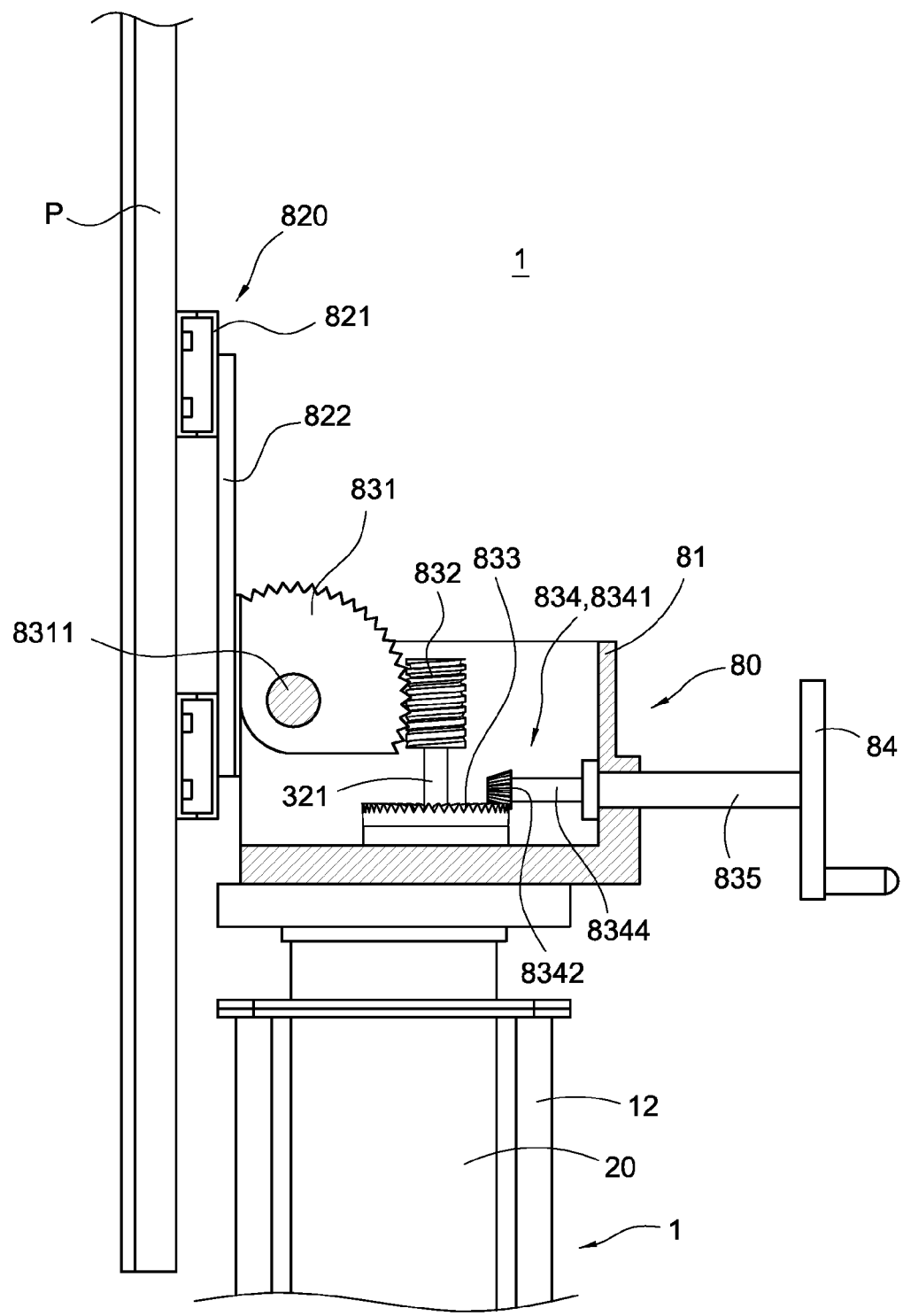
FIG. 8 is a sectional view showing the application of the second embodiment of the present invention.
Figure 9:
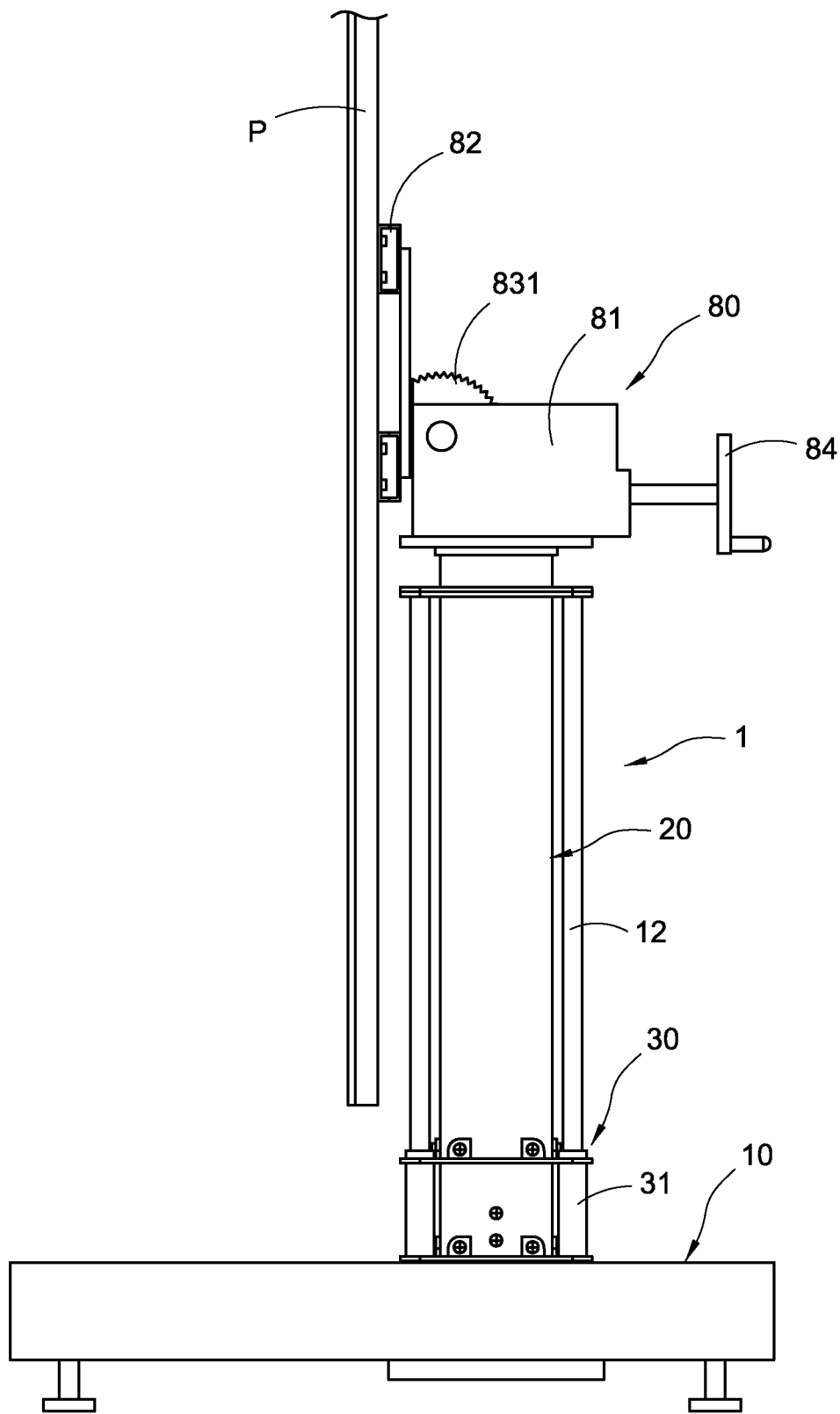
FIG. 9 is a sectional view showing the application of according to another aspect of the second embodiment of the present invention.

Please refer to FIGS. 7-9, which are perspective view of a panel rotating mechanism, sectional view showing the application, sectional view showing another application according to a second embodiment of the present invention, the primary difference from the above-mentioned embodiment is that the supporting device 1 further comprises a panel rotating mechanism 80 disposed between the panel P and the supporting sleeve 20 such that the supporting device 1 can elevate and rotate the panel P.

The panel rotating mechanism 80 includes a gear box 81, a fixing plate 82, a gear assembly 83 and a manual rotating disc 84. The lower surface of the gear box 81 is connected to the upper surface of the supporting sleeve 40, and the gear box 81 covers the gear assembly 83.

The fixing plate 82 is disposed to a side of the gear box 81. The fixing plate 82 has a supporting portion 821 and a fixing surface 822. The supporting portion 821 is located at a side of the fixing plate 82 away from the gear box 81. The supporting portion 821 is connected to a back surface of the panel P so as to support the panel P. The fixing surface 822 is located at a side of the fixing plate 82 adjacent to the gear box 81.

The gear assembly 83 includes a first gear 831, a worm gear 832, a second gear 833, a third gear 834 and a fourth shaft 835. The first gear 831 has a first shaft 8311 pivotally connected to the gear box 81. The first gear 831 has a side welded to the fixing surface 822 with each other and penetrates the gear box 81. The first gear 831 is a spur gear and is of a shape of quartered-arc disc.

The worm gear 832 has a second shaft 8321 pivotally connected to the gear box 81. The worm gear 832 engages with the first gear 831. The worm gear 832 is vertical to a horizontal line. The second gear 833 is sleeved on the second shaft 8321 between the gear box 81 and the worm gear 832. The second gear 833 is a helical gear.

The third gear has a pinion gear 8342 and a third shaft 8344. The third shaft 8344 fixedly penetrates the pinion gear 8342 and is connected to the fourth shaft 835. The pinion gear 8342 engages with the second gear 833. The pinion gear 8342 is a helical gear.

The fourth shaft 835 has a side away from the third shaft 8344 can penetrate the gear box 81 and is connected to the manual rotating disc 84. In addition, the fourth shaft 835 can further be connected to the actuator. The actuator can drive the fourth shaft 835 rotate so as to rotate the third shaft 8344.

Substantially, the manual rotating disc 84 rotates to drive the fourth shaft 835 to rotate. The fourth shaft 835 drives the third shaft 8344 to rotate so as to drive the pinion gear 3412. The pinion gear 3412 drives the second gear 833 to rotate so as to drive the worm gear 832 to rotate such that the worm gear 832 drive the first gear 831 to rotate and further that the first gear 831 drives the fixing plate 82 to rotate in order to arbitrarily rotate and adjust the angle of the panel P. In addition, the manual rotating disc 84 can be replaced by the motor so as to drive the fourth shaft 835 to rotate such that the effect of arbitrarily rotating and adjusting the angle of the panel P can be achieved.

Since the worm gear 832 is vertical to the horizontal line, it can avoid a gap generated during the worm gear 832 driving the first gear 831 so as to prevent the panel P from vibrating during rotation and adjustment.

Further, since the second gear 832 and the pinion gear 8342 are helical gears, and the helical gear has advantages of stable engagement, low impact and high capacity, it can enhance the structural strength of the gear assembly 83 so as to prevent the rotatedly adjusted angle of the panel P from changing through heavier panel P rendering the first gear 831 to drive the worm gear 832 to rotate. Therefore, it can improve the weight capacity for the panel P of the supporting device 1.

In addition, the gear box 81 can further cover an outside of the gear assembly 83 so as to prevent dust or external articles, which render shutdown of the gear assembly 83, from entering the gap of the gear assembly 83.

In conclusion, the panel supporting device with elevating function according to the present invention is useful, novel and non-obvious. Further, the construction of the present invention is neither seen in similar products nor in a public use such that it totally complies with requirements for the application of a Utility patent. Applicant applies for a patent according to the Patent Law.

What is claimed is:

1. A panel supporting device with elevating function, comprising:
   a supporting frame including a plurality of guiding posts separated with each other, a separating space being formed between adjacent guiding posts;
   a supporting sleeve disposed inside the separating space and having a side located away from the supporting frame and connected to said panel;
   a panel rotating mechanism disposed between said panel and the supporting sleeve;
   a guiding cover member fixedly covering an outside of the supporting sleeve and having a plurality of guiding holes, the guiding posts penetrating and sliding in the guiding holes;
   a driving block fixed inside the supporting sleeve and having a screw hole and an inserting slot;
   a lead screw accommodated inside the supporting sleeve and screwed in the screw hole; and
   a positioning liner accommodated inside the supporting sleeve, the positioning liner penetrating and sliding in the inserting slot;
   wherein the lead screw is driven to rotate so as to render linear reciprocating movement of the driving block, the driving block drives the supporting sleeve to move up and down, and the supporting sleeve drives said panel to elevate.

2. The panel supporting device with elevating function of claim 1, wherein the driving block has a bump formed in the inserting slot, the screw hole is formed on the bump, the positioning liner having a hollow sliding way and an opening slot formed on a side thereof and communicated with the hollow sliding way, and the bump slides into the hollow sliding way from the opening slot.

3. The panel supporting device with elevating function of claim 1, further comprising a motor, the supporting frame further including a base, each of the guiding posts having an end connected to the base, the base having a containing slot, the motor accommodated in the containing slot, the motor connected to an end of the lead screw away from the supporting sleeve.

4. The panel supporting device with elevating function of claim 1, wherein the guiding cover member includes a plurality of guiding sleeves separately arranged to and fixedly surrounding an outside of the supporting sleeve, each of the guiding sleeves having the guiding hole.

5. The panel supporting device with elevating function of claim 4, wherein the guiding cover member further includes at least one annular plate, the annular plate having a plurality of fixing holes and fixedly covering an outside of the supporting sleeve, each of the fixing holes fixedly penetrating an outside of each of the guiding sleeves.

6. The panel supporting device with elevating function of claim 1, wherein the panel rotating mechanism includes a gear box, a fixing plate and a gear assembly, the gear box covering the gear assembly, the gear assembly connected to said panel via the fixing plate.

7. The panel supporting device with elevating function of claim 6, wherein the gear assembly includes a first gear having a side penetrating the gear box and connected to the fixing plate, a worm gear engaged with the first gear, a second gear connected to an end of the worm gear away from the first gear and a third gear engaged with the second gear.

8. The panel supporting device with elevating function of claim 7, wherein the first gear has a first shaft, the worm gear has a second shaft, the second gear is inserted on the second shaft, and the first shaft and the second shaft are pivotally connected to the gear box, respectively.

9. The panel supporting device with elevating function of claim 7, further comprising a manual rotating disc, the gear assembly further including a fourth shaft penetrating the gear box and connected to the manual rotating disc, the third gear having a third shaft connected to a side of the fourth shaft away from the manual rotating disc and a pinion gear engaged with the second gear, the pinion gear being a helical gear.

10. The panel supporting device with elevating function of claim 7, further comprising an actuator, the gear assembly further including a fourth shaft having a side connected to the actuator, the third gear having a third shaft connected to a side of the fourth shaft away from the actuator and a pinion gear engaged with the second gear, the pinion gear being a helical gear.

11. The panel supporting device with elevating function of claim 7, wherein the first gear is of a shape of quartered-arc disc, the first gear is a spur gear, the second gear is a helical gear.

* * * * *